(12) United States Patent
Alhashim et al.

(10) Patent No.: US 11,684,888 B2
(45) Date of Patent: Jun. 27, 2023

(54) INTEGRATED HEAT MANAGEMENT SYSTEMS AND PROCESSES FOR ADSORBED NATURAL GAS STORAGE FACILITIES

(71) Applicant: Saudi Arabian Oil Company, Dhahran (SA)

(72) Inventors: Mohammed Alhashim, Dhahran (SA); Calogero Migliore, Dhahran (SA); Yuguo Wang, Dhahran (SA); Rashid Othman, Dhahran (SA); Ahmad Bahamdan, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 185 days.

(21) Appl. No.: 17/144,783

(22) Filed: Jan. 8, 2021

(65) Prior Publication Data
US 2022/0219108 A1     Jul. 14, 2022

(51) Int. Cl.
*B01D 53/04*     (2006.01)
*F25B 17/08*     (2006.01)
*F25B 27/00*     (2006.01)

(52) U.S. Cl.
CPC ..... *B01D 53/0438* (2013.01); *B01D 53/0462* (2013.01); *F25B 17/08* (2013.01); *F25B 27/007* (2013.01); *B01D 2253/102* (2013.01); *B01D 2253/108* (2013.01); *B01D 2253/112* (2013.01); *B01D 2256/24* (2013.01)

(58) Field of Classification Search
CPC ........................... B01D 3/007; B01D 53/0438; B01D 53/0462; F17C 11/007; F25B 17/08; F25B 27/007
See application file for complete search history.

(56) References Cited

U.S. PATENT DOCUMENTS

| | | | |
|---|---|---|---|
| 4,637,218 A | 1/1987 | Tchernev | |
| 4,920,752 A | 5/1990 | Ehrsam | |
| 4,995,235 A | 2/1991 | Halene | |
| 5,768,910 A | 6/1998 | Inagaki et al. | |
| 9,016,084 B2 | 4/2015 | Alden et al. | |
| 9,562,649 B2 * | 2/2017 | Wang | B01D 53/0462 |

(Continued)

FOREIGN PATENT DOCUMENTS

| | | |
|---|---|---|
| CN | 105570672 A | 5/2016 |
| RU | 2626525 C1 | 7/2017 |
| WO | 2014152815 A1 | 9/2014 |

OTHER PUBLICATIONS

Invitation to Pay Additional Fees issued in International Application No. PCT/US2022/011508, dated May 4, 2022; pp. 1-17.

*Primary Examiner* — Sharon Pregler
(74) *Attorney, Agent, or Firm* — Bracewell LLP; Constance G. Rhebergen; Eleanor L. Tyson

(57) ABSTRACT

Systems and methods for heat exchange during gas adsorption and desorption cycling, one method including removing heat from an adsorbent material during gas adsorption to the adsorbent material; storing the removed heat for later use during desorption of gas from the adsorbent material; heating the adsorbent material during desorption of gas from the adsorbent material using at least a portion of the removed heat; and recycling heat during the step of heating to prepare a working fluid for the step of removing heat via temperature reduction of the working fluid.

15 Claims, 2 Drawing Sheets

(56) References Cited

U.S. PATENT DOCUMENTS

| | | |
|---|---|---|
| 9,797,629 B2 | 10/2017 | Mittelbach |
| 2009/0229555 A1 | 9/2009 | Ginzburg et al. |
| 2010/0133280 A1 | 6/2010 | Stein et al. |
| 2014/0290611 A1 | 10/2014 | Abd Elhamid et al. |
| 2016/0033081 A1* | 2/2016 | Coleman ............... F17C 11/007 165/104.34 |
| 2017/0203249 A1* | 7/2017 | Gebald ................. B01D 53/62 |

* cited by examiner

INTEGRATED HEAT MANAGEMENT SYSTEMS AND PROCESSES FOR ADSORBED NATURAL GAS STORAGE FACILITIES

BACKGROUND

Field

The present disclosure relates to natural gas storage via adsorption and heat management. In particular, the present disclosure shows efficient heat exchange units and processes for managing temperatures during natural gas adsorption and desorption processes.

Description of the Related Art

Natural gas is the portable and preferred fuel of choice around the world. Natural gas burns more completely than other traditional fuels, including petroleum and coal; therefore, the combustion of natural gas is comparatively less harmful to the environment. Natural gas and similar products, including LNG, propane and other compressed-gas fuels are much more efficient in engine and turbine combustion systems.

An important component of natural gas and sales gas is methane. When burned, methane emits carbon dioxide at about thirty percent less than oil, and natural gas is considered environment-friendly compared to other fossil fuels. This is one reason for the relatively rapid growth in using natural gas for heating and electricity generation over the past few decades.

The storage capacity of a pipe or vessel can be increased by filling it with an adsorbent that has high adsorptive storage capacity for methane, and this technology is called adsorbed natural gas storage (ANG). Certain processes include introducing natural gas into the natural gas storage facility, separating the natural gas into a heavy natural gas component and a light natural gas component, and retaining the components in the storage facility. The process also includes releasing the heavy and light natural gas components and mixing them into a released natural gas product for power plants.

Compressed natural gas (CNG) systems and processes for transporting natural gas require increased pressures. CNG requires greater pressures up to about 250 bars, and this increases the cost of compression and wall thickness for large vessels which prevents inexpensive manufacturing. With respect to liquid natural gas (LNG), LNG is the most practically used method for large scale exporting through ships. LNG, however, requires a re-gasification infrastructure, which makes it impractical for independent power generators, domestic users, and natural gas filling stations to receive LNG.

When producing electricity or natural gas for non-commercial users, a significant problem arises for natural gas transportation networks: diurnal demand. People, unlike manufacturing plants or facilities, tend not to be steady energy users throughout the day. People consume greater amounts of electricity during the day and into the early evening and much less at night and into the early morning. The higher rates of consumption form a "peak period of demand" and the lower rate of consumption creates a "non-peak period of demand." This daily trend occurs throughout the year.

During different seasons, however, the length of each period (longer or shorter periods of natural light requiring lesser or greater amounts of artificial light, respectively) and the amplitude of the period (for example, greater amounts demanded at higher and lower temperatures versus more moderate temperatures) can change the amplitude of the demand during the diurnal period. The location of the demand also has an impact upon what the diurnal demand is like. In cooler environments, overall daily electrical and natural gas demand is lower in the summer months and higher in winter months as consumers use heating equipment. In warmer environments, the daily demand trends are opposite as consumer use air conditioning units to stay cool.

Swinging electrical and natural gas consumption—not only in daily use but also in seasonal differences—results in variability across the natural gas transportation and production system. However, natural gas production is nearly constant. The supply-demand gap between natural gas production and total consumption results in a "gas demand lag." The lag, without intervention, manifests itself as system pressure increases and decreases ("swings") across the natural gas transportation system.

Electrical generation facilities prefer constant, high-pressure natural gas as a feedstock. Pressure swings in natural gas feed can damage the electrical generation equipment, especially rotational equipment, including gas turbines, due to sudden inappropriate feed-to-fuel ratios that cause equipment slowdowns while under load.

Past solutions to mitigate pressure swings include in-line compressors in the transportation systems. CNG booster compressors that operate during peak demand periods attempt to maintain transportation system pressure. The loss of natural gas feed pressure can result in both downtime for electrical generators and dissatisfied public customers.

Using compression equipment increases operating expenses of the transmission system because the compression equipment operates at CNG transportation system pressure. The compression equipment also must be operable to tolerate the shift in daily operating temperatures. In-line compressors are expensive to maintain because they do not steadily operate: they start when system pressure is at a low threshold value and stop when system pressure is at a high threshold value.

Compressors, despite best maintenance practices, do inadvertently break down. Rotational equipment breakdowns sometimes are catastrophic, requiring weeks of downtime while delivering and tuning new units. The sudden loss of natural gas feed pressure from a malfunction can result in immediate downtime for downstream electrical generators and long-term dissatisfied public consumers.

One bottleneck preventing the widespread use of electrical power from renewable sources such as solar power is the intermittency of these energy sources. Solar radiation is at its peak during daylight hours and becomes negligible during nighttime hours. Natural gas as a thermal source to produce electricity can be used to compensate for reductions in solar energy, or wind energy. Thus, the swing in the demand for natural gas is expected with renewable energy as well.

Adsorption-based temporary natural gas storage systems have been proposed. Certain systems store natural gas in an adsorption bed during non-peak hours and release the stored gas during peak periods. These systems ensure sustainability of feed pressure to power generation plants alleviating cyclic operations of involved rotating equipment and warrant continuous power production.

Physical adsorption of natural gas is associated with heat release, and desorption requires supply of energy (heat) to fully extract trapped gas from adsorbent materials. Thus, some energy is consumed to ensure optimum operation of adsorption-based gas storage technologies. A measure of how much energy is required to operate an adsorption based gas storage unit is the isosteric heat of adsorption, or in other words the amount of heat released per mole of gas adsorbed. For adsorbent materials with high storage capacity of natural gas such as activated carbons, the isosteric heat of adsorption is in the range of about 17-25 kJ/mol. Certain prior art systems propose external accessory solar energy to control the adsorption bed temperature, and the minimum energy required to operate a facility, for one adsorption-desorption cycle, will be in the range of about 34-50 kJ/mol.

For present gas adsorption systems to manage swing due to diurnal demand, heat management systems are needed to efficiently manage temperatures of adsorbents during gas adsorption and desorption cycles.

SUMMARY

One embodiment of the present disclosure includes a method for heat exchange during gas adsorption and desorption cycling, the method including removing heat from an adsorbent material during gas adsorption to the adsorbent material; storing the removed heat for later use during desorption of gas from the adsorbent material; heating the adsorbent material during desorption of gas from the adsorbent material using at least a portion of the removed heat; and recycling heat during the step of heating to prepare a working fluid for the step of removing heat via temperature reduction of the working fluid.

One system of the present disclosure includes a system for heat exchange during gas adsorption and desorption cycling, the system including a gas adsorption unit, the gas adsorption unit in fluid communication with a cooling loop adapted to cool adsorbent material of the gas adsorption unit during an adsorption cycle, and in fluid communication with a heating loop adapted to heat the adsorbent material of the gas adsorption unit during a desorption cycle; a heat pump, wherein the heat pump is adapted to remove heat from the cooling loop and provide the removed heat to the heating loop; a first insulated storage tank to store chilled working fluid for the cooling loop; and a second insulated storage tank to store heated working fluid for the heating loop.

BRIEF DESCRIPTION OF THE DRAWINGS

These and other features, aspects, and advantages of the present disclosure will become better understood with regard to the following descriptions, claims, and accompanying drawings. It is to be noted, however, that the drawings illustrate only several embodiments of the disclosure and are therefore not to be considered limiting of the disclosure's scope as it can admit to other equally effective embodiments.

DETAILED DESCRIPTION

Figure 1:
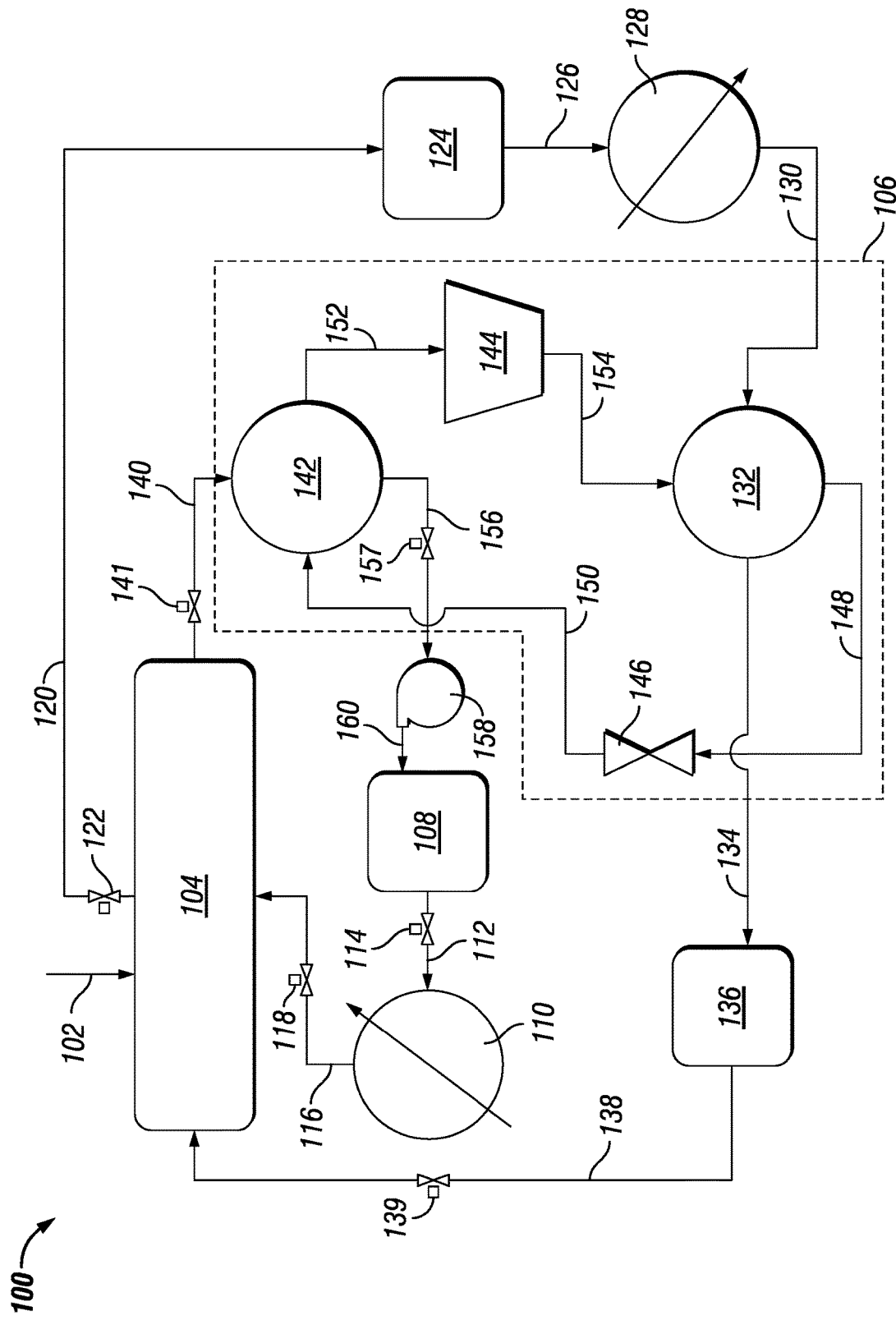
FIG. 1 is a process flow diagram for one embodiment of a system for thermal storage and heat exchange during adsorption and desorption cycles, for example for natural gas adsorption and desorption on adsorbent materials.

So that the manner in which the features and advantages of the embodiments of systems and methods for efficient heat exchange for managing temperatures during natural gas adsorption and desorption processes, as well as others, which will become apparent, may be understood in more detail, a more particular description of the embodiments of the present disclosure briefly summarized previously may be had by reference to the embodiments thereof, which are illustrated in the appended drawings, which form a part of this specification. It is to be noted, however, that the drawings illustrate only various embodiments of the disclosure and are therefore not to be considered limiting of the present disclosure's scope, as it may include other effective embodiments as well.

Embodiments disclosed here show efficient systems and methods for thermal integration in gas adsorption temporary storage facilities, such as those used to accommodate the effects of diurnal peak demand on a natural gas source. Thermal energy storage (TES) systems are applied to timely transfer and exchange, using a fluid carrier, heat during an adsorption-desorption cycle. The TES systems include a heat pump and two separate, distinct, insulated tanks to store the energy carrier fluid at high and low temperature conditions. In one embodiment, the coefficient of performance of a heat pump for heat exchange is approximately equal to 4. Thus, a minimum of about 25% of the transferred energy is required to operate the facility. For a gas storage system using an adsorbent material with a heat of adsorption of 20 kJ/mol, the use of the TES systems and methods can surprisingly and unexpectedly reduce the energy consumption of the facility by up to 78%, which is equivalent to consuming only 1.4 vol. % of stored natural gas volume (with a heating value of 910 Btu/SCF).

Therefore, embodiments disclosed provide efficient adsorbed natural gas storage facilities that store thermal energy produced when gas is adsorbed in one or more adsorption bed and utilize the thermal energy (simultaneously or at a later time, within the same adsorbed natural gas storage facility or a different adsorbed natural gas storage facility) to facilitate gas release during peak demand periods. In the TES systems and methods, one or more heat pump and at least two tanks are used to store a temperature modifying fluid (working fluid), and used to transfer energy to and from the adsorption bed, at alternating high and low temperature conditions. The heat pump includes a compressor, a condenser, an evaporator, and an expansion valve. In some embodiments, it uses a refrigerant fluid to transfer energy, removing heat from the adsorbent during an adsorption cycle and providing heat to the adsorbent during a desorption cycle.

In some known heat pumps, the coefficient of performance is approximately 4. Thus, given that the isosteric heat of adsorption ranges from about 17-25 kJ/mol in certain embodiments, the minimum energy required to operate the adsorption storage facility (work needed to run the heat pump and to reject input energy) will be in the range of about 9-13 kJ/mol for the adsorption-desorption cycle. This translates into consuming a minimum of about 2.2-3.4 vol. % of the stored natural gas with a heating value of 910 Btu/SCF. In some embodiments, with the use of spilled solar energy during radiation peak periods to run equipment of the TES systems and methods, energy consumption can be further reduced to 1.1-1.7 vol. % of stored gas. From this analysis, an advantageous, surprising, and unexpected eightfold decrease in energy consumption can be achieved by utilizing the proposed TES systems and methods.

Referring now to FIG. 1, a process flow diagram is shown for one embodiment of a system for thermal storage and heat exchange during adsorption and desorption cycles, for example for natural gas adsorption and desorption. In thermal energy storage and heat exchange adsorption system 100, a compressed gas line 102 feeds compressed gas under pressure to a gas adsorption skid 104 comprising adsorbent material to adsorb gas. In some embodiments, the gas includes natural gas such as methane, but in other embodiments compressed gas can include other types of gas such as carbon dioxide, for example. Adsorbent materials can include activated carbons in addition to or alternative to zeolites, metal organic frameworks (MOF's), and polymers, or any other suitable adsorbent materials for adsorbing compressed gas.

In the example embodiment shown, gas adsorption skid 104 contains two adsorption beds loaded with microporous material. One description of how gas is introduced to and removed from such a unit or multiple units is found in U.S. Pat. No. 9,562,649, incorporated here by reference in its entirety. Here, embodiments for thermal energy storage and heat exchange are described. Generally, a temperature modifying fluid (working fluid) is introduced to gas adsorption skid 104 at a low temperature to absorb and remove heat released during the adsorption stage via indirect heat transfer. The working fluid is then stored to be used later during the desorption stage to supply needed energy (heat) to facilitate gas release from the adsorption bed. A heat pump 106, dashed line in FIG. 1, is used to exchange energy between separate working fluid and refrigerant streams.

During an adsorption stage where a gas such as natural gas is introduced to gas adsorption skid 104 via compressed gas line 102, a working fluid, initially stored in tank 108 at low temperature conditions passes to a chiller 110, such as for example an air cooled chiller, via line 112 with control valve 114 to reduce its temperature to an appropriate value. Tank 108 and other tanks described and line 112 along with other lines described can be thoroughly insulated to prevent heat or cooling losses. Chiller 110, and other units described requiring power, can be operated by either or both burning some of the stored gas or using excess solar energy, or other renewable sources such as wind, produced during peak radiation periods or wind periods when the storage facility is used for solar-based power plants or wind-based power plants.

Chilled working fluid, which can include either or both of liquid or gas refrigerant or water, then flows to gas adsorption skid 104 via chilled fluid line 116 with control valve 118. After passing through coils inside adsorption beds (not pictured) of gas adsorption skid 104 for indirect heat transfer, the chilled working fluid leaves gas adsorption skid 104 via line 120 with control valve 122 to fill insulated tank 124 at a temperature slightly lower than that of the adsorption beds of gas adsorption skid 104. During adsorption of gas such as natural gas, the chilled working fluid absorbs heat from gas adsorption skid 104, increasing its temperature. Tanks 108 and 124 are thermally insulated in the embodiment shown to minimize heat leakage to and from the tanks. Chiller 110 is used in the embodiment shown to reject input energy to operate heat pump 106 and is optionally used to compensate for heat leakage into tank 108 from the environment that tends to increase the temperature of the working fluid.

During a desorption stage, working fluid stored in tank 124 is supplied to gas adsorption skid 104. First, the working fluid passes via line 126 to auxiliary heater 128, auxiliary heater 128 compensating for any heat losses from tank 124. Next, the working fluid proceeds via line 130 to a condenser 132 to increase the working fluid's temperature to an appropriate selected target value (for heating adsorbent materials for gas release in gas adsorption skid 104). Then, the working fluid proceeds via line 134 to optional auxiliary tank 136, which in the embodiment shown is used to initiate the desorption stage. The auxiliary heater 128 in some embodiments includes an electric heater, and its duty depends at least in part on the heat loss rate in tank 124. In some embodiments, condenser 132 includes a shell and tube heat exchanger in which the working fluid passes through the shell side while a refrigerant at high temperature conditions passes through the tube side. The volume of auxiliary tank 136 depends in part on the volume of pipe connections between auxiliary tank 136 and tank 108. Ultimately, heated working fluid at a target increased temperature passes to gas adsorption skid 104 via line 138 with control valve 139 for release of gas, such as natural gas, from adsorbent materials.

The use of auxiliary tank 136 is optional to ensure proper fluid temperature entering adsorption skid 104 at the startup of the desorption cycle. Fluid temperature at tank 124 is not suitable to pass through the adsorption skid during the desorption process. In another embodiment, the auxiliary heater 128 can be used to increase the temperature of the fluid to a target temperature that is suitable to heat up the adsorption bed at the startup of the desorption cycle and tank 136 is not required.

Inside heat pump 106, a refrigerant fluid is circulated to exchange energy/heat between working fluid exiting gas adsorption skid 104 in line 140 with control valve 141 during a desorption cycle and working fluid from line 130 entering condenser 132. The heat pump includes evaporator 142, compressor 144, condenser 132, and expansion valve 146. Heat pump 106 operates to exchange heat as understood by those of ordinary skill in the art as refrigerant fluid is recirculated between condenser 132, expansion valve 146, evaporator 142, and compressor 144 via lines 148, 150, 152, and 154. Once working fluid exiting gas adsorption skid 104 in line 140 during a desorption cycle passes through evaporator 142, indirectly removing more heat from the working fluid to the refrigerant, the working fluid passes to pump 158 via line 156 with control valve 157, and then to tank 108 via line 160 to be used as a chilled working fluid during an adsorption cycle for heat removal from gas adsorption skid 104.

Figure 2:
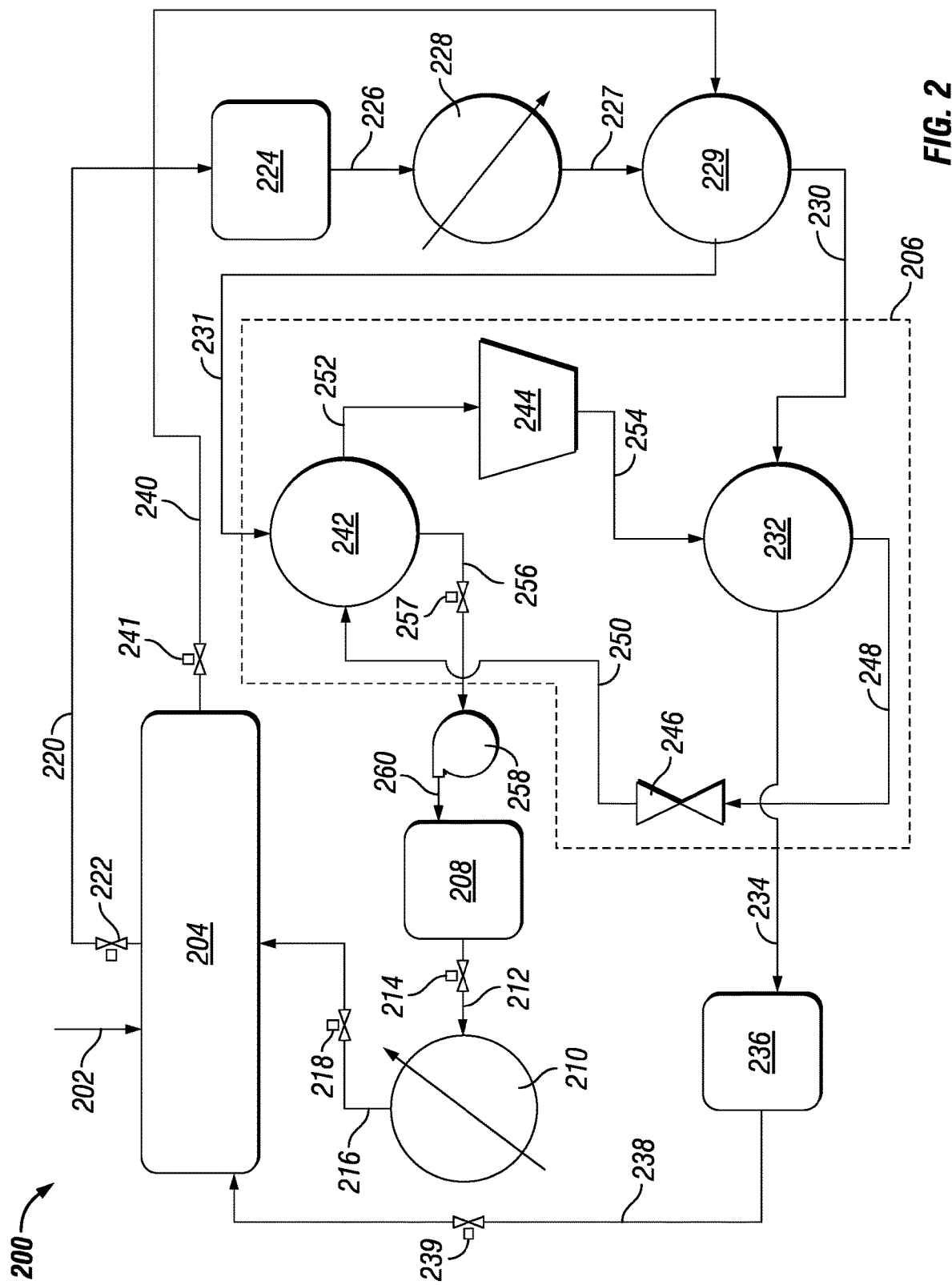
FIG. 2 is a process flow diagram for one embodiment of a system for thermal storage and heat exchange during adsorption and desorption cycles with additional heat exchange beyond that shown for FIG. 1, for example for natural gas adsorption and desorption on adsorbent materials.

Equipment sizing to design a natural gas storage facility, for example that shown in FIG. 1 or FIG. 2, depends in part on the properties of the material used to adsorb methane, for example a microporous material in addition to or alternative to other adsorbent materials. Activated carbons, zeolites, and metal-organic frameworks (MOFs) are advantageous microporous materials to be used to store natural gas. Activated carbons exhibit relatively low cost, high adsorption capacity, and mechanical and thermal stability for systems and processes described here.

Surface characterization of adsorbent materials includes measurements of pore size distribution, bulk density, adsorption isotherms, and isosteric heat of adsorption, which all can be measured using commercially-available analytical equipment.

Once the properties of the microporous material, such as the adsorption capacity, bulk density and the isosteric heat of adsorption, are determined, the number, $N_{bed}$, of required adsorption beds with a given volume $V_{bed}$, can be calculated via Equation 1:

$$N_{bed} = \frac{V_{storage}}{0.79\,(V_{bed}q(P,T)\rho + n(P,T,V_{bed}\epsilon))} \qquad \text{Eq. 1}$$

In Eq. 1, V storage is the total volume (in SCF) of stored gas. $V_{bed}$ is the volume of an adsorption bed available to be filled with the adsorbent, and E is the total porosity of the bed (dimensionless). q is the adsorption isotherm of the selected material (in mol/kg), ρ is the bulk density of the adsorbent (in kg/m³) and n is the amount of compressed gas (in mol) in the void volume and is calculated using an appropriate equation of state. P (in bar) and T (in K) are the pressure and temperature of the adsorption bed, respectively.

In some embodiments, an adsorption (compressed gas charging) stage duration is longer than that of a gas desorption stage. Thus, tank, unit, and line size is determined based in part on the desorption stage using the temperature difference between working fluid in lines 138 and 140. The temperature of working fluid in line 138 is a set target value, while the temperature of working fluid in line 140 is calculated using Equation 2:

$$\frac{\Delta H_{ads} V_{bed} q(P, T) \rho}{t_D} = U A_{bed} \Delta T_{ln} \qquad \text{Eq. 2}$$

In Equation 2, $t_D$ is the desorption duration (in seconds), $\Delta H_{ads}$ is the isoteric heat of adsorption (in kJ/mol), U is the overall heat transfer coefficient (in W/K/m²), and $A_{bed}$ is the heat exchange area (in m²) in the adsorption bed. $\Delta T_{ln}$ is the log-mean temperature difference and is defined in Equation 3:

$$\Delta T_{ln} = \frac{T_{140} - T_{138}}{\ln\left(\frac{T_{140} - T}{T_{138} - T}\right)} \qquad \text{Eq. 3}$$

In Equation 3, $T_i$ is the temperature of a given stream i (in K), and T is the temperature of the adsorption bed (in K). Once the temperature of working fluid in line 140 is obtained, the size of the tanks 108, 124 can be estimated using Equation 4:

$$V = N_{bed} \frac{\Delta H_{ads} V_{bed} q(P, T) \rho}{\rho_f C_{p_f} \Delta T} \qquad \text{Eq. 4}$$

Here, V is the volume of tank 124 (in m³), $\rho_f$ and $C_{pf}$ are the working fluid's density and specific heat capacity, respectively. ΔT is the temperature difference between working fluid in lines 138 and 140. The flow rate of the working fluid is given by $V/t_D$ where $t_D$ is the desorption time. Similar to the temperature of working fluid in line 138 during desorption stage, the temperature of working fluid in line 116 can be used to control the adsorption bed temperature during the adsorption stage, and the temperature is set such that the circulation rate of the working fluid is given by $V/t_A$ where $t_A$ is the adsorption duration. The temperature of working fluid in line 120 is calculated using Equation 2 by replacing $t_D$ with the adsorption duration.

In one embodiment for an optimum operation of a heat pump, for example as shown in FIG. 1, temperature of the evaporator 142 is set such that the refrigerant leaves the evaporator in line 152 at a temperature, $T_{152}$, in the vapor phase with a vapor fraction of 1. The pressure of the evaporator is equal to the saturation pressure of the refrigerant at $T_{152}$. In a similar way, temperature of condenser 132 is set such that the refrigerant leaves the condenser in line 148 at a temperature, $T_{148}$, in a liquid phase, that is the vapor fraction equal to zero. The pressure of the refrigerant fluid in line 148 is equal to the refrigerant's saturation pressure at $T_{148}$. The efficiency of the system of FIG. 1 is in part a function of the outlet refrigerant temperatures of evaporator 142 and condenser 132. System efficiency is increased by decreasing the difference between these temperatures. Therefore, the size of required heat exchangers, evaporators, and condensers will increase as a result of decreasing the temperature difference.

In one embodiment, heating duty of auxiliary heater 128 is calculated by assuming that tank 124 is an underground tank and heat dissipation from the tank follows the solution of heat transfer from a semi-infinite slab which is given by Equation 5:

$$\text{Heat dissipation Rate} = V^{\frac{2}{3}} \frac{k \Delta T}{\sqrt{\alpha t}} \qquad \text{Eq. 5}$$

In Equation 5, V is the volume of the tank calculated using Equation 4. k and α are the thermal conductivity and diffusivity of the underground environment and are equal to $$k = 0.52 \ \frac{W}{Km} \ \text{and} \ \alpha = 10^{-7} \ \text{m}^2/\text{s},$$

respectively. ΔT is the temperature difference between the tank (124) and the underground environment. For chiller 110, additional duty to compensate for heat ingress to tank 108 should be accounted for using Equation 5 assuming that tank 108 is an underground tank. For both tanks 108 and 124, the temperature of the stored working fluid therein, $T_{tank}$ after a period of time, t, of storage is given by Equation 6:

$$T_{tank} = T_{init} + (T_g - T_{init}) \left[ 1 - \exp\left(-\frac{2k}{V^{\frac{1}{3}} \rho C_{p_f} \sqrt{\alpha}} \sqrt{t}\right) \right] \qquad \text{Eq. 6}$$

Here, $T_{init}$ is the initial tank temperature and $T_g$ is the underground environment's temperature, which is assumed to be equal to 30° C. in the Examples described infra.

Example 1. Adsorbed Gas Storage Facility to Store 140,000 SCF (140 MSCF) of Natural Gas at 960 psig In this example, similar to the system and process of FIG. 1, activated carbon with properties similar to those described in Esteves, I., et al. titled Adsorption of natural gas and biogas components on activated carbon, Separation and Purification Tech., 62, 281-296 (2008) is used as an adsorbent material. Water is used to control the adsorption bed's temperature as a working fluid and R-134a is used as the refrigerant fluid. Table 1 lists design parameters used to simulate the performance of the thermal energy storage system during the adsorption and desorption stages. U is the heat transfer coefficient and A is the exchange surface area, and UA is the result of U multiplied by A.

TABLE 1

List of design parameters used and equipment size needed
to store 140 MSCF of natural gas at 960 psig.

| Design Parameter | Value |
| --- | --- |
| Adsorption Capacity (mol/kg) | 7 |
| Heat of adsorption (kJ/mol) | 20 |
| Total Porosity of bed | 0.5 |
| Bulk density (kg/m$^3$) | 500 |
| Total bed available volume (m$^3$) | 35 |
| Total bed UA value (kJ/° C. s) | 12.9 |
| Discharging time (hrs) | 4 |
| Charging time (hrs) | 8 |
| Adsorption bed temperature (° C.) | 35 |

During the adsorption stage, cold water stored in tank 108 at a temperature of 23° C. is used to maintain the temperature of gas adsorption skid 104 at 35° C. In this example chiller 110 includes an air cooled chiller, which is used to further cool down the water (working fluid) to a temperature of 15° C. The chilled working fluid leaves gas adsorption skid 104 via line 120 with gained heat, at a temperature of 34° C. and is stored in tank 124. The working fluid circulation rate during the adsorption stage is 16.7 gallons per minute, and the temperature of working fluid in line 120 is calculated using Equation 1.

During a desorption discharging cycle, heat supply to gas adsorption skid 104 is needed in order to maintain the process at isothermal conditions and to more completely desorb natural gas. Fluid stored in tank 124 is heated up using heat pump 106 to a temperature of 60° C. Auxiliary heater 128, such as an electric heater, is used to compensate for heat losses from tank 124, if needed. Auxiliary tank 136 is used to initiate the desorption process by supplying a hot fluid at 60° C. to gas adsorption skid 104. Working fluid leaves gas adsorption skid 104 via line 140 at 41° C. and passes through evaporator 142 to cool down to 23° C. It is then stored in tank 108 to be used as a chilled working fluid when the adsorption stage starts. With water as a working fluid the circulation rate during the desorption stage is 33.4 gpm. Other suitable working fluids, such as organic fluids or gases can be used in addition to or alternative to water. Table 2 summarizes the operating conditions of the thermal energy storage system in this example and based on FIG. 1, and Table 3 summarizes the size and duties of certain equipment.

TABLE 2

Operation conditions of the adsorbed storage
facility of FIG. 1 in Example 1.

| Stream | P (bar) | T (° C.) |
| --- | --- | --- |
| 112 | 1.6 | 23.07 |
| 116 | 1.5 | 14.87 |
| 120 | 1.4 | 33.82 |
| 126 | 1.4 | 33.6 |
| 130 | 1.4 | 33.82 |
| 134 | 1.3 | 60.0 |
| 138 | 1.3 | 60.0 |
| 140 | 1.2 | 41.09 |
| 156 | 1.1 | 23.06 |
| 160 | 1.6 | 23.4 |
| 152 | 3.48 | 5.0 |
| 154 | 19.08 | 80.3 |
| 148 | 18.98 | 65.0 |
| 150 | 3.48 | 5.0 |

TABLE 3

Equipment duties and design parameters for Example 1 and FIG. 1.
The duty of chiller 110 includes compensation for heat ingress.

| Equipment Design Parameters | Value |
| --- | --- |
| Evaporator 142 UA value (kJ/° C. s) | 6.30 |
| Condenser 132 UA value (kJ/° C. s) | 10.63 |
| Auxiliary Heater 128 duty (kW) | 1.98 |
| Chiller 110 duty (kW) | 39.65 |
| Compressor 144 duty (kW) | 74.39 |
| Pump 158 duty (kW) | 0.14 |
| Refrigerant flow rate in heat pump 106 (kg/s) | 1.57 |
| Tank 124 volume (m$^3$) | 30.32 |
| Tank 108 volume (m$^3$) | 30.32 |
| Auxiliary Tank 136 volume (m$^3$) | 1 |
| Estimated gas storage skid footprint (m$^2$) | 60 |
| Estimated TES system footprint (m$^2$) | 30 |

In some embodiments, heat pump 106 runs during a desorption stage while the chiller 110, such as an air cooled chiller, runs during the adsorption stage, and the total energy consumption of the adsorbed storage facility is calculated to be 614.76 kWhr. Since power production efficiency is about 50%, the energy consumption of the adsorbed storage facility is equivalent to burning 4.61 MSCF of the stored gas, or 3.29 vol. % of total gas volume stored.

FIG. 2 is a process flow diagram for one embodiment of a system for thermal storage and heat exchange during adsorption and desorption cycles with additional heat exchange beyond that shown for FIG. 1, for example for natural gas adsorption and desorption.

Example 2. Adsorbed Storage Facility to Store 140
MSCF of Natural Gas at 960 psig with Additional
Heat Exchange Integration In this example for FIG. 2, activated carbon with properties described in Esteves, I., et al. titled Adsorption of natural gas and biogas components on activated carbon, Separation and Purification Tech., 62, 281-296 (2008) is used as an adsorbent material. Water is used as a working fluid to control the temperature in the adsorption beds and R-134a is used as the refrigerant of the heat pump. A heat exchanger 229, such as for example a shell and tube heat exchanger, is used to integrate heat within the heating system used to keep the temperature of the gas adsorption vessel at appropriate temperature values. This increases the efficiency of the thermal energy storage system, even beyond that shown for FIG. 1 and Example 1.

In FIG. 2, a process flow diagram is shown for one embodiment of a system for thermal storage and heat exchange during adsorption and desorption cycles, for example for natural gas adsorption and desorption. In thermal energy storage and heat exchange adsorption system 200, a compressed gas line 202 feeds compressed gas under pressure to a gas adsorption skid 204 comprising adsorbent material to adsorb gas. In some embodiments, the gas includes natural gas such as methane, but in other embodiments compressed gas can include other types of gas such as carbon dioxide, for example. Adsorbent materials can include activated carbons in addition to or alternative to zeolites and polymers, or any other suitable adsorbent materials for adsorbing compressed gas.

In the example embodiment shown, gas adsorption skid 204 contains adsorption beds loaded with microporous material (not pictured). One description of how gas is introduced to and removed from such a unit or multiple units is found in U.S. Pat. No. 9,562,649, incorporated here by reference in its entirety. A temperature modifying fluid (working fluid) is introduced to gas adsorption skid 204 at a low temperature, less than that of the adsorption beds during gas adsorption, to indirectly absorb heat released during the adsorption stage. The working fluid is then stored to be used later during the desorption stage to supply needed energy (heat) to facilitate gas release from the adsorption bed. A heat pump 206, dashed line in FIG. 2, is used to exchange energy between separate working fluid and refrigerant streams.

During an adsorption stage where a gas such as natural gas is introduced to gas adsorption skid 204 via compressed gas line 202, a working fluid, initially stored in tank 208 at low temperature conditions passes to a chiller 210, such as for example an air cooled chiller, via line 212 with control valve 214 to reduce its temperature to an appropriate, pre-selected value, less than the temperature of gas adsorption skid 204 during the adsorption cycle. Tank 208 and other tanks described and line 212 along with other lines described can be thoroughly insulated to prevent heat or cooling losses. Chiller 210, and other units described requiring power, can be operated by either or both by burning some of the stored gas or using excess solar energy, or other renewable sources such as wind, produced during peak radiation periods or wind periods when the storage facility is used for solar-based power plants or wind-based power plants.

Chilled working fluid, which can include either or both of liquid or gas refrigerant in addition to or alternative to water and other fluids, then flows to gas adsorption skid 204 via chilled fluid line 216 with control valve 218. After passing through coils inside adsorption beds (not pictured) of gas adsorption skid 204, the chilled working fluid leaves gas adsorption skid 204 via line 220 with control valve 222 to fill insulated tank 224 at a temperature slightly lower than that of the adsorption beds of gas adsorption skid 204. During adsorption of gas such as natural gas, the chilled working fluid absorbs heat from gas adsorption skid 204, increasing its temperature. Tanks 208 and 224 are thermally insulated in the embodiment shown to minimize heat leakage to and from the tanks. Chiller 210 is used in the embodiment shown, but is optional, to compensate for heat leakage into tank 208 from the environment that tends to increase the temperature of the working fluid.

During a desorption stage, working fluid stored in tank 224 is supplied to gas adsorption skid 204. First, the working fluid passes via line 226 to optional auxiliary heater 228, auxiliary heater 228 compensating for any heat losses from tank 224. Next, the working fluid proceeds via line 227 to a heat exchanger 229, for example one or more shell and tube heat exchanger, to increase the working fluid's temperature from the heat of the working fluid in line 240. Next, the working fluid proceeds via line 230 to a condenser 232 to increase the working fluid's temperature to an appropriate selected target value (for heating adsorbent materials for gas release in gas adsorption skid 204). Then, the working fluid proceeds via line 234 to optional auxiliary tank 236, which can be used to initiate the desorption stage to ensure proper working fluid temperature at the begging of a desorption cycle.

The auxiliary heater 228 in some embodiments includes an electric heater, and its duty depends at least in part on the heat loss rate in tank 224. In some embodiments, condenser 232 includes a shell and tube heat exchanger in which the working fluid passes through the shell side while a refrigerant at high temperature conditions passes through the tube side. The volume of auxiliary tank 236 depends in part on the volume of pipe connections between auxiliary tank 236 and tank 208. Ultimately, heated working fluid at a target increased temperature passes to gas adsorption skid 204 via line 238 with control valve 239 for release of gas, such as natural gas, from adsorbent materials.

Inside heat pump 206, a refrigerant fluid is circulated to exchange energy/heat between working fluid exiting gas adsorption skid 204 and resulting in line 231 during a desorption cycle and working fluid from line 230 entering condenser 232. The heat pump includes evaporator 242, compressor 244, condenser 232, and expansion valve 246. Heat pump 206 operates to exchange heat as understood by those of ordinary skill in the art as refrigerant fluid is recirculated between condenser 232, expansion valve 246, evaporator 242, and compressor 244 via lines 248, 250, 252, and 254. Once working fluid exiting gas adsorption skid 204 in line 240 during a desorption cycle passes through heat exchanger 229 and evaporator 242 via line 231, removing more heat from the fluid, the working fluid passes to pump 258 via line 256 with control valve 257, and then to tank 208 via line 260 to be used as a chilled working fluid during an adsorption cycle for heat removal from gas adsorption skid 204.

In one embodiment, during the adsorption stage, cold water stored in tank 208 at a temperature of 22° C. is used to maintain the temperature of gas adsorption skid 204 at 35° C. Chiller 210, such as an air cooled chiller, can be used to further cool down the water-based working fluid to a temperature of 15° C. The chilled working fluid leaves gas adsorption skid 204 in line 220 at a temperature of 34° C. and is stored in tank 224. Water circulation rate during the adsorption stage is 16.7 gpm and the temperature of working fluid in line 220 is calculated using Equation 1.

During the desorption cycle, heat supply to gas adsorption skid 204 is needed in order to maintain the process at isothermal conditions and fully release adsorbed gas. Fluid stored in tank 224 at a temperature of 34° C. is heated up using heat pump 206 to a temperature of 60° C. Auxiliary heater 228, for example including an electric heater, is used to compensate for heat losses in tank 224. Auxiliary tank 236 is used to initiate the desorption process by supplying a hot working fluid at 60° C. to gas adsorption skid 204. In addition to using heat pump 206, heat is exchanged between working fluid in lines 227 and 240. Hot working fluid in line 240 exits gas adsorption skid 204 at 41° C., and it passes through heat exchanger 229 cooling down to 38° C. Working fluid in line 231 passes through evaporator 242 to cool down to 22° C. It is then stored in tank 208 to be used when the adsorption stage begins. Water circulation rate during the desorption stage is 33.4 gpm.

Table 4 lists design parameter values used to simulate the performance of the thermal energy storage system during the adsorption and desorption stages in FIG. 2. Table 5 summarizes the operating conditions of the thermal energy storage system of FIG. 2 in one embodiment, and Table 6 summarizes the sizes and duties of certain equipment.

TABLE 4

List of design parameters used to size needed equipment to store 140 MSCF of natural gas at 960 psig.

| Design Parameter | Value |
| --- | --- |
| Adsorption Capacity (mol/kg) | 7 |
| Heat of adsorption (kJ/mol) | 20 |
| Total Porosity of bed | 0.5 |
| Bulk density (kg/m$^3$) | 500 |

TABLE 4-continued

List of design parameters used to size needed equipment to store 140 MSCF of natural gas at 960 psig.

| Design Parameter | Value |
| --- | --- |
| Total beds available volume (m³) | 35 |
| Total beds heat exchange area (m²) | 129 |
| Discharging time (hrs) | 4 |
| Charging time (hrs) | 8 |
| Adsorption bed temperature (° C.) | 35 |

TABLE 5

Operation Conditions of the adsorbed storage facility.

| Stream | P(bar) | T(° C.) |
| --- | --- | --- |
| 212 | 1.8 | 21.93 |
| 216 | 1.7 | 14.87 |
| 220 | 1.6 | 33.82 |
| 226 | 1.6 | 33.6 |
| 227 | 1.6 | 33.82 |
| 234 | 1.4 | 60.0 |
| 238 | 1.4 | 60.0 |
| 240 | 1.3 | 41.09 |
| 256 | 1.1 | 21.92 |
| 260 | 1.8 | 21.93 |
| 252 | 3.48 | 5.0 |
| 254 | 19.08 | 80.3 |
| 248 | 18.98 | 65.0 |
| 250 | 3.48 | 5.0 |
| 231 | 1.2 | 37.42 |
| 230 | 1.5 | 37.5 |

TABLE 6

Equipment duties and design parameters for FIG. 2 and Example 2. The duty of chiller 210 includes compensation for heat ingress.

| Equipment Design Parameters | Value |
| --- | --- |
| Evaporator 242 UA value (kJ/° C. s) | 5.92 |
| Condenser 232 UA value (kJ/° C. s) | 9.73 |
| Heat Exchanger 229 UA value (kJ/° C. s) | 11.75 |
| Auxiliary Heater 228 duty (kW) | 1.98 |
| Chiller 210 duty (kW) | 35.12 |
| Compressor 244 duties (kW) | 63.94 |
| Pump 258 duty (kW) | 0.14 |
| Heat Pump 206 Refrigerant flow rate (kg/s) | 1.35 |
| Tank 224 volume (m³) | 30.32 |
| Tank 208 volume (m³) | 30.32 |
| Tank 236 volume (m³) | 1 |
| Estimated gas storage skid footprint (m²) | 60 |
| Estimated TES system footprint (m²) | 30 |

In some embodiments, heat pump 206 runs during the desorption stage while chiller 210 runs during the adsorption stage, and the total energy consumption (for one adsorption stage and one desorption stage) of the adsorbed storage facility is calculated to be 536.74 kWhr. Since power production efficiency is about 50%, the energy consumption of the adsorbed storage facility is equivalent to burning 4.02 MSCF of the stored gas, or 2.88 vol. % of total amount of stored natural gas.

Example 3. Integrating the Adsorbed Storage Facility with a Solar-Based Power Plant In a renewable-based power plant (such as solar, wind, or any other intermittent renewable energy source or combination thereof) that is not equipped with energy storage technology, fossil fuel can be used to compensate for shortages in renewable power supply, for example when solar radiation is low and the power demand is high. Since energy storage technologies are not widely used with renewable power production, produced electric energy is "spilled" during low demand periods. In this example, a method of integrating the adsorption storage facility, described in FIG. 2 and Example 2, with such solar-based power plants is described.

During non-peak hours when produced electricity is spilled, the gas adsorption storage facility operates on either adsorption or stand by modes. Thus, spilled energy can be used to operate chiller 210 shown in FIG. 2. This leads to a reduction in power consumption of the adsorption facility in terms of burning a certain amount of stored gas or other fossil fuels. Using the same operating conditions shown in Table 5, 1.37 vol. % of total gas volume stored is needed to operate the adsorption facility when it is integrated with a renewable-based power plant that does not store excess electric power.

This example is independent of the size of the renewable power plant. One important parameter is that the spilled energy (difference between supply and demand) is larger than the energy required to run the chiller.

Therefore disclosed here are methods for heat exchange during gas adsorption and desorption cycling, one method including removing heat from an adsorbent material during gas adsorption to the adsorbent material; storing the removed heat for later use during desorption of gas from the adsorbent material; heating the adsorbent material during desorption of gas from the adsorbent material using at least a portion of the removed heat; and recycling heat during the step of heating to prepare a working fluid for the step of removing heat via temperature reduction of the working fluid.

In some embodiments, the method includes the step of storing the working fluid during the step of recycling in an insulated tank for later use in the step of removing heat. Still in other embodiments the method includes the step of chilling the working fluid prior to the step of removing heat. In other embodiments, at least a portion of the removed heat and at least a portion of the recycled heat are applied to increase the temperature of the working fluid prior to the heating step. Still other embodiments include the step of applying auxiliary heat to the working fluid to increase the temperature of the working fluid prior to the step of heating, beyond a temperature increase achieved by the removed heat and the recycled heat. In yet other embodiments, the step of storing includes the use of an insulated tank and a portion of the working fluid. Still in other embodiments, the step of recycling includes the use of a heat pump, the heat pump comprising an evaporator, a compressor, a condenser, and an expansion valve, and wherein the evaporator, the compressor, the condenser, and the expansion valve are fluidly coupled for a refrigerant fluid to travel therebetween.

In certain embodiments the step of removing heat maintains the temperature of the adsorbent material between about 25° C. and about 45° C. and the step of heating maintains the temperature of the adsorbent material between about 45° C. and about 55° C. Still in other embodiments the working fluid comprises water. In some embodiments, the adsorbent material is selected from the group consisting of: activated carbon, zeolites, membranes, metal organic frameworks, and combinations of the same. In other embodiments, the adsorbent material adsorbs natural gas. Still in other embodiments, the method includes the step of applying a heat exchanger prior to the step of recycling to extract heat to combine with the removed heat. In certain embodiments, the heat exchanger comprises a shell and tube heat exchanger.

In yet other embodiments of the method, the step of chilling the working fluid comprises the use of an air cooled chiller. In still other embodiments, the method includes the use of renewable energy to power at least a portion of the method, the renewable energy selected from the group consisting of: solar power, wind power, and combinations thereof. In certain other embodiments, the renewable energy includes solar power, and the solar power is spilled solar power. Still in other embodiments, the method is powered by a portion of natural gas adsorbed to the adsorbent material, the portion of natural gas less than 5 vol. % of the total amount of adsorbed natural gas. In some embodiments, the method is powered by a portion of natural gas adsorbed to the adsorbent material, the portion of natural gas less than 3 vol. % of the total amount of adsorbed natural gas.

Additionally disclosed are systems for heat exchange during gas adsorption and desorption cycling, one system including a gas adsorption unit, the gas adsorption unit in fluid communication with a cooling loop adapted to cool adsorbent material of the gas adsorption unit during an adsorption cycle, and in fluid communication with a heating loop adapted to heat the adsorbent material of the gas adsorption unit during a desorption cycle; a heat pump, wherein the heat pump is adapted to remove heat from the cooling loop and provide the removed heat to the heating loop; a first insulated storage tank to store chilled working fluid for the cooling loop; and a second insulated storage tank to store heated working fluid for the heating loop.

In some embodiments, the system includes a chiller fluidly coupled to the first insulated storage tank adapted to lower the temperature of stored chilled working fluid prior to use in the cooling loop. In other embodiments, the chiller comprises an air cooled chiller. Still in other embodiments, the system further includes an auxiliary heater coupled to the second insulated storage tank to increase the temperature of stored heated working fluid prior to use in the heating loop.

In certain embodiments, the heat pump comprises an evaporator, a compressor, a condenser, and an expansion valve, and wherein the evaporator, the compressor, the condenser, and the expansion valve are fluidly coupled for a refrigerant fluid to travel therebetween. Still in other embodiments, the cooling loop maintains the temperature of the adsorbent material between about 25° C. and about 45° C. and where the heating loop maintains the temperature of the adsorbent material between about 45° C. and about 55° C. In yet other embodiments, the working fluid comprises water. In certain embodiments of the system, the adsorbent material is selected from the group consisting of: activated carbon, zeolites, membranes, metal organic frameworks, and combinations of the same. In certain embodiments, the adsorbent material is adapted to adsorb natural gas. Still in other embodiments, the system includes a heat exchanger fluidly coupled to the second insulated storage tank and the heat pump, the heat exchanger adapted to remove heat from heated working fluid exiting the gas adsorption unit and recycle heat to the heating loop.

In some embodiments, the heat exchanger comprises a shell and tube heat exchanger. In other embodiments, the system further includes renewable energy to power at least a portion of the system, the renewable energy selected from the group consisting of: solar power, wind power, and combinations thereof. Still in other embodiments, the renewable energy includes solar power, and the solar power is spilled solar power. In some embodiments of the system, the system is powered by a portion of natural gas adsorbed to the adsorbent material, the portion of natural gas less than 5 vol. % of the total amount of adsorbed natural gas. And in yet other embodiments, the system is powered by a portion of natural gas adsorbed to the adsorbent material, the portion of natural gas less than 3 vol. % of the total amount of adsorbed natural gas. In certain embodiments, the system includes a third insulated storage tank to store heated working fluid for the heating loop, the third insulated storage tank fluidly located between the heat pump and the gas adsorption unit, wherein the third insulated storage tank is adapted to store working fluid heated by the heat pump.

The term "about" when used with respect to a value or range refers to values including plus and minus 5% of the given value or range.

The singular forms "a," "an," and "the" include plural referents, unless the context clearly dictates otherwise.

In the drawings and specification, there have been disclosed embodiments of systems and methods for efficient heat exchange for managing temperatures during natural gas adsorption and desorption processes, as well as others, and although specific terms are employed, the terms are used in a descriptive sense only and not for purposes of limitation. The embodiments of the present disclosure have been described in considerable detail with specific reference to these illustrated embodiments. It will be apparent, however, that various modifications and changes can be made within the spirit and scope of the disclosure as described in the foregoing specification, and such modifications and changes are to be considered equivalents and part of this disclosure.

The invention claimed is:

1. A method for heat exchange during gas adsorption and desorption cycling, the method comprising the steps of:
removing heat from an adsorbent material during gas adsorption to the adsorbent material, where the adsorbent material is selected from the group consisting of: activated carbon, zeolites, membranes, metal organic frameworks, and combinations of the same, where removing heat maintains the temperature of the adsorbent material between about 25° C. and about 45° C.;
storing the removed heat for later use during desorption of gas from the adsorbent material;
heating the adsorbent material during desorption of gas from the adsorbent material using at least a portion of the removed heat, where heating maintains the temperature of the adsorbent material between about 45° C. and about 55° C.; and
recycling heat during the step of heating to prepare a working fluid for the step of removing heat via temperature reduction of the working fluid, wherein the working fluid comprises water.

2. The method according to claim 1, further comprising the step of storing the working fluid during the step of recycling in an insulated tank for later use in the step of removing heat.

3. The method according to claim 2, further comprising the step of chilling the working fluid prior to the step of removing heat.

4. The method according to claim 1, wherein at least a portion of the removed heat and at least a portion of the recycled heat are applied to increase the temperature of the working fluid prior to the heating step.

5. The method according to claim 4, further comprising the step of applying auxiliary heat to the working fluid to increase the temperature of the working fluid prior to the step of heating, beyond a temperature increase achieved by the removed heat and the recycled heat.

6. The method according to claim 1, wherein the step of storing includes the use of an insulated tank and a portion of the working fluid.

7. The method according to claim 1, wherein the step of recycling includes the use of a heat pump, the heat pump comprising an evaporator, a compressor, a condenser, and an expansion valve, and wherein the evaporator, the compressor, the condenser, and the expansion valve are fluidly coupled for a refrigerant fluid to travel therebetween.

8. The method according to claim 1 wherein the adsorbent material adsorbs natural gas.

9. The method according to claim 1, further comprising the step of applying a heat exchanger prior to the step of recycling to extract heat to combine with the removed heat.

10. The method according to claim 9, wherein the heat exchanger comprises a shell and tube heat exchanger.

11. The method according to claim 3, wherein the step of chilling the working fluid comprises the use of an air cooled chiller.

12. The method according to claim 1, further comprising the use of renewable energy to power at least a portion of the method, the renewable energy selected from the group consisting of: solar power, wind power, and combinations thereof.

13. The method according to claim 1, where the method is powered by a portion of natural gas adsorbed to the adsorbent material, the portion of natural gas less than 5 vol. % of the total amount of adsorbed natural gas.

14. The method according to claim 1, where the method is powered by a portion of natural gas adsorbed to the adsorbent material, the portion of natural gas less than 3 vol. % of the total amount of adsorbed natural gas.

15. The method according to claim 12, where the renewable energy includes solar power, and the solar power is spilled solar power.

* * * * *